United States Patent
Venkumahanti et al.

(10) Patent No.: US 8,880,958 B2
(45) Date of Patent: Nov. 4, 2014

(54) INTERLEAVED ARCHITECTURE TRACING AND MICROARCHITECTURE TRACING

(75) Inventors: Suresh K. Venkumahanti, Austin, TX (US); Prasanna Kumar Balasundaram, San Diego, CA (US); Robert A. Lester, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 335 days.

(21) Appl. No.: 13/237,071

(22) Filed: Sep. 20, 2011

(65) Prior Publication Data
US 2013/0073910 A1    Mar. 21, 2013

(51) Int. Cl.
*G06F 11/273* (2006.01)
*G06F 11/36* (2006.01)

(52) U.S. Cl.
CPC ........ *G06F 11/3636* (2013.01); *G06F 11/3656* (2013.01)
USPC .............................................. 714/45; 714/30

(58) Field of Classification Search
CPC . G06F 11/3636; G06F 11/364; G06F 11/348; G06F 11/349
USPC ................................................... 714/45, 30
See application file for complete search history.

(56) References Cited

U.S. PATENT DOCUMENTS

| | | | |
|---|---|---|---|
| 7,412,630 B2 | 8/2008 | Thekkath | |
| 7,562,258 B2 | 7/2009 | Williams et al. | |
| 8,214,701 B1 * | 7/2012 | Malhotra et al. | 714/725 |
| 2002/0178405 A1 | 11/2002 | McCullough et al. | |
| 2006/0224873 A1 | 10/2006 | McCormick, Jr. et al. | |
| 2007/0011330 A1 * | 1/2007 | Dinker et al. | 709/226 |
| 2007/0240020 A1 * | 10/2007 | Laschinsky et al. | 714/45 |
| 2008/0115115 A1 * | 5/2008 | Codrescu et al. | 717/128 |
| 2008/0256396 A1 * | 10/2008 | Giannini et al. | 714/45 |
| 2009/0132863 A1 * | 5/2009 | Ashfield et al. | 714/45 |
| 2009/0313507 A1 | 12/2009 | Swaine et al. | |

(Continued)

FOREIGN PATENT DOCUMENTS

WO        2006030381 A2      3/2006

OTHER PUBLICATIONS

ARM Limited: "ARM1176JZ-S(TM) Technical Reference Manual, Chapter 1: Introduction; Chapter 15: Trace Interface Port", ARM1176JZ-S(TM) Technical Reference Manual, No. Revision: r0p7, Nov. 27, 2009, p. i-xvii, 1-1 -1-46, 15-1-15-8, XP002687968, Retrieved from the Internet: URL:http://infocenter.arm.com/help/topic/com.arm.doc.ddi0333h/DDI0333H__arm1176jzs__r0p7__trm.pdf [retrieved on Nov. 26, 2012].

(Continued)

*Primary Examiner* — Chae Ko
(74) *Attorney, Agent, or Firm* — Peter Michael Kamarchik; Nicholas J. Pauley; Joseph Agusta (57) ABSTRACT

Systems and method for embedded trace macrocell (ETM) devices configured to dynamically interleave architecture/program tracing with microarchitecture/hardware tracing. An ETM device includes logic to enable interleaved program tracing and hardware state sampling. A core interface is configured to receive program trace and hardware state information of a microprocessor and a combining module is configured to interleave the program trace and hardware state information. A packet generation module may be configured to packetize the program trace and hardware state information into packets at operational speeds of the microprocessor.

24 Claims, 4 Drawing Sheets

(56) References Cited

U.S. PATENT DOCUMENTS

2010/0281309 A1    11/2010   Laurenti et al.
2010/0322237 A1*   12/2010   Raja et al. .................... 370/389
2012/0226804 A1*    9/2012   Raja et al. .................... 709/224

OTHER PUBLICATIONS

ARM Limited: "CoreSight ETM11 Technical Reference Manual", 20070517, No. Revision: r1p1 May 17, 2007, pp. I-XVI,1, XP002660025, Retrieved from the Internet: URL:http://infocenter.arm.com/help/topic/com.arm.doc.ddi0318e/DDI0318E_cs_etm11_r1p1_trm.pdf [retrieved on Sep. 27, 2011].

ARM Limited: "Embedded Trace Macrocell Architecture Specification", 20110101, No. ETM v1.0 to ETM v3.5, Sep. 23, 2011, pp. 1-420, XP007921321.

International Search Report and Written Opinion—PCT/US2012/056430—ISA/EPO—Dec. 10, 2012.

Ho Fai Ko, Nicolici, N. "Algorithms for State Restoration and Trace-Signal Selection for Data Acquisition in Silicon Debug," Computer-Aided Design of Integrated Circuits and Systems, IEEE Transactions on. Issue Date: Feb. 2009, vol. 28 Issue: 2, pp. 285-297. ISSN: 0278-0070.

\* cited by examiner

INTERLEAVED ARCHITECTURE TRACING AND MICROARCHITECTURE TRACING

FIELD OF DISCLOSURE

Disclosed embodiments are directed to embedded monitoring devices such as embedded trace macrocells (ETMs). More particularly, exemplary embodiments are directed to ETM devices configured to dynamically interleave architecture/program tracing with microarchitecture/hardware tracing.

BACKGROUND

Processing systems such as microprocessors are configured to fetch programs or instructions from memory and execute them. An embedded trace macrocell (ETM) is a hardware unit commonly included in microprocessors to trace code execution sequences. The ETM is configured to compress the execution sequence and transmit the information in packets, such that the execution sequence can be reconstructed.

Information pertaining to the execution sequence is very valuable for software debug and development. Additionally, information pertaining to the internal hardware state or microarchitecture state of the microprocessor would be desirable to debug any unexpected hardware behavior. Conventionally, the information pertaining to code execution sequences as generated by an ETM is transmitted through input/output pins of a chip and analyzed by debugger software. The internal microarchitecture state can be observed through tools such as an oscilloscope. The microarchitecture state can also be transmitted through the inputs/outputs pins of the packaged chip or with the help of some bonding pads in an unpackaged chip.

However, the above conventional approach suffers from several deficiencies. Firstly, the trace of code execution sequence (hereinafter, also referred to as "instruction trace" or "architecture state") is not correlated with a microarchitecture state. In other words, the microarchitecture state and architecture state cannot be efficiently collated or juxtaposed such that the architecture and corresponding microarchitecture states may be observed together. Therefore, debugging unexpected behavior is a challenging task.

Secondly, the operational speeds that can be supported at the input/output pins of the chip are extremely limited, and especially low in comparison to normal operating speeds of the microprocessor. Accordingly, the microarchitecture state signals transmitted through the input/output pins to tools such as oscilloscopes may not correspond to real time operating speeds. Moreover it may not be possible or practical to observe fast changing signals, such as at operating speeds of the microprocessor, through an oscilloscope.

A third deficiency of the conventional approach includes the challenges associated with controlling timing and skew between the large number of signals transmitted through the input/output pins of the chip. The maximum number of input/output pins a chip can have is limited by the packaging constraints. Moreover, mapping the data observed through the pins to accurately correspond to a timeline of the microprocessor's code execution sequence is also very difficult. At best, it may be possible to capture information pertaining to the internal state within a limited time window because memory capacity of devices such as oscilloscopes is very limited.

Another major drawback of the conventional approach arises from the fact that it is very difficult to precisely control start and stop points for the limited time window for capturing information pertaining to the internal state. Accordingly, it becomes difficult to synchronize architecture and microarchitecture states.

In order to mitigate the above mentioned problems, there is a need in the art for methods and apparatus for efficiently correlating architecture and microarchitecture traces in microprocessors.

SUMMARY

Exemplary embodiments of the invention are directed to systems and method for embedded trace macrocell (ETM) devices configured to dynamically interleave architecture/program tracing with microarchitecture/hardware tracing.

For example, an exemplary embodiment is directed to an Embedded Trace Macrocell (ETM) device comprising logic to enable interleaved program tracing and hardware state sampling; a core interface configured to receive program trace and hardware state information of a microprocessor, and a combining module configured to interleave the program trace and hardware state information.

Another exemplary embodiment is directed to a method for interleaved tracing of hardware states of a microprocessor with program tracing in an embedded monitoring device comprising: dynamically enabling hardware state tracing and program tracing; receiving program trace and hardware state information; and dynamically interleaving and synchronizing the program trace and hardware state information.

Yet another exemplary embodiment is directed to a system comprising: means for dynamically enabling hardware state tracing and program tracing in an embedded monitoring device; means for receiving program trace and hardware state information; and means for dynamically interleaving and synchronizing the program trace and hardware state information.

Another exemplary embodiment is directed to a non-transitory computer-readable storage medium comprising code, which, when executed by a processor, causes the processor to perform operations for interleaved tracing of hardware states of a microprocessor with program tracing in an embedded monitoring device, the non-transitory computer-readable storage medium comprising: code for dynamically enabling hardware state tracing and program tracing; code for receiving program trace and hardware state information; and code for dynamically interleaving and synchronizing the program trace and hardware state information.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Disclosed embodiments are directed to ETM devices configured to overcome the challenges associated with aforementioned conventional tracing techniques. For example, embodiments may include ETM devices configured to efficiently correlate instruction trace information with internal states of the microprocessor. An exemplary ETM may be configured to observe the internal states of the microprocessor and transmit the same, along with the instruction trace information. As described herein, the terms "microarchitecture state", "hardware state" and "internal state" may be used interchangeably, wherein a "microarchitecture trace" may refer to trace information pertaining to these states. Similarly, as described herein, the terms "architecture trace", "instruction trace" and "program trace" may be used interchangeably, and these traces may pertain to "architecture states" of the microprocessor.

Figure 1:
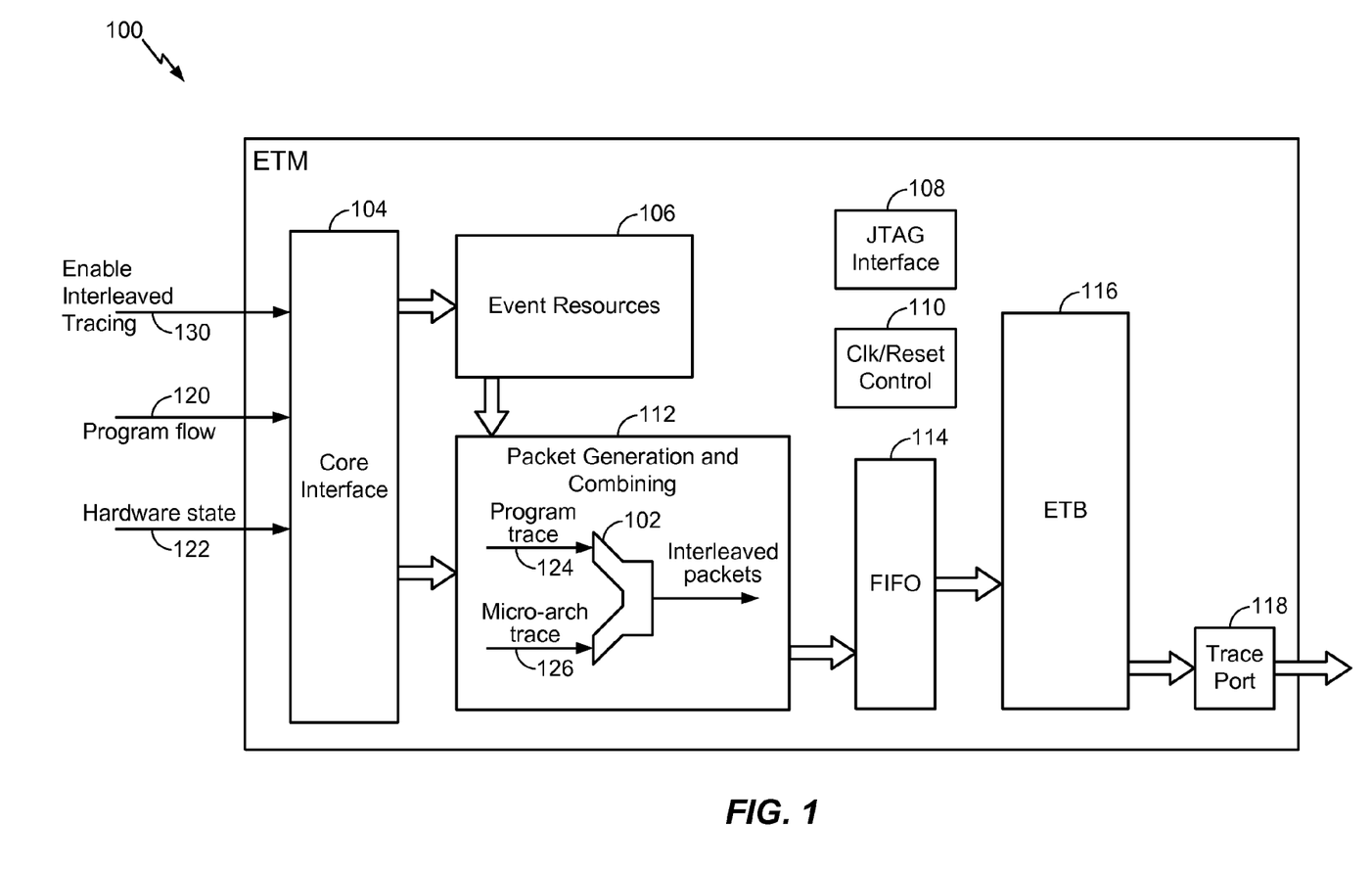
FIG. 1 illustrates an ETM device according to an exemplary embodiment.

With reference now to FIG. 1, an implementation of an exemplary ETM 100 is shown. ETM 100 may be operatively coupled to a microprocessor core (not shown). As shown, both program flow information and hardware state information is input on buses 120 and 122 respectively to ETM 100. The program flow information on bus 120 may include information such as: whether a particular instruction was committed on a particular cycle, the program counter of the particular instruction, whether a branch instruction was executed by the microprocessor, whether an interrupt was taken, etc. This program flow information may be used by the ETM to reconstruct the flow of instructions being executed on the microprocessor. Correspondingly, hardware states of the microprocessor, such as data stored in pipeline registers of an execution unit in the microprocessor, may be sampled at every cycle of the microprocessor or at some specified interval and driven on bus 122.

With continuing reference to FIG. 1, the program flow information 120 and hardware state information 122 may be fed to core interface 104 in ETM 100. Core interface 104 may serve as an interface unit from the microprocessor core to ETM 100. Core interface 104 may appropriately direct the received information to event resources module 106 and packet generation and combining module 112. Event resources module 106 may receive program execution sequence and determine whether to trace the architecture and/or microarchitecture information, based on user-defined configurations. Event resources module 106 may also determine whether to trace the program state and/or microarchitecture state based on internal or external events to the microprocessor, such that packets may be generated to comprise information regarding relevant hardware states of the microprocessor for selected instructions.

Packet generation and combining module 112 may be configured to packetize the traced program sequence in a compact fashion such that long traces of program may be effectively sent in smaller packets. The Packet generation module may also be configured to sample the microarchitecture state at a specified sampling rate and be sent in packets, such as microarchitecture state packets 126. Program trace packets 124 and microarchitecture trace packets 126 may be input to logic 102. Logic 102 may be configured to combine program trace packets 124 and micro-architecture state packets 126 into a consolidated stream such as a contiguous byte stream, such that they may be input to FIFO 114.

The microarchitecture states and program states may be packetized individually as described above, or they may alternately be packetized together. Different header fields may be used in the packets to distinguish program trace information from hardware state information. In some instruction cycles the program trace packets may occupy the entire bandwidth of packet generation and combining module 112 (referred to herein as "packet generation bandwidth"). For example, during a memory address or data instruction, the program trace packets may occupy the entire packet generation bandwidth. In such cases when the packet generation bandwidth is consumed by the program trace packets, the sampling and packetizing of the microarchitecture states 126 may be delayed, thus also delaying the microarchitecture packet generation. In order to protect data corresponding to microarchitecture states 126 from being lost if such delaying occurs, appropriate buffer logic (not shown) may be coupled to core interface 104.

Further, the above described operations of interleaving program trace and hardware states in packet generation and combining module 112 may be controlled by logic to enable the interleaving operations. For example, as shown in FIG. 1, the signal, enable interleaved tracing 130 may be input to core interface 104, in addition to program flow 120 and hardware state 122. Enable interleaved tracing 130 may be subsequently transmitted to packet generation and combining module 112. Based on enable interleaved tracing 130, logic (not separately shown in FIG. 1) may be configured to enable the interleaving operations. Enable interleaved tracing 130 may be controlled by a programmer, or by any other suitable means.

The discrete packets may then be transferred to first-in-first-out buffer (FIFO) 114. FIFO 114 may be used to store the discrete packets, serialize them, and transfer them out, such that the speed at which the packets are processed thereafter may be adjusted. For example, the input/output pins of ETM 100 may only support speeds that are much slower than the operational speed of the microprocessor. Accordingly, FIFO 114 may be used to slow down the speeds associated with the packets, from operational speed of the microprocessor to the speeds supported by the input/output pins.

Embedded trace buffer (ETB) 116 may further assist in storing data processed by ETM 100. For example, packets comprising interleaved program trace and hardware state may be read out at a desirable speed from FIFO 114, and stored in ETB 116 until the packets may be transferred out of ETM 100 through trace port 118. The combination of FIFO 114 and ETB 116 may effectively assist in transferring high speed trace information received by ETM 100 to low speed external devices such as an external trace collector memory (not shown) or an oscilloscope (not shown), such that the received trace information may be accurately analyzed.

Also, as illustrated in FIG. 1, ETM 100 may comprise a Joint Test Action Group (JTAG) interface 108. JTAG interfaces such as JTAG 108 are well known in the art, and may be included for debugging integrated circuits of the microprocessor through boundary scan chains. In addition to core interface 104, JTAG interface 108 may be configured as a programming interface to ETM 100, such that information such as sampling rates for hardware state tracing may be received through JTAG interface 108. JTAG interface 108 may also control the monitoring of hardware buses associated with the microprocessor. Clock reset/control 110 may also be included in ETM 100 for controlling a clock for the various components of ETM 100 and for generation/propagation of a reset signal.

Exemplary embodiments of ETM 100 may be configured by reusing and reconfiguring available software and hardware debug resources for observing the internal states of the microprocessor. Accordingly, embodiments may deliver debug solutions that cure the limitations of conventional methods of transmitting the microprocessor states through the pins of the chip, and correlating them with architecture traces.

Figure 2:
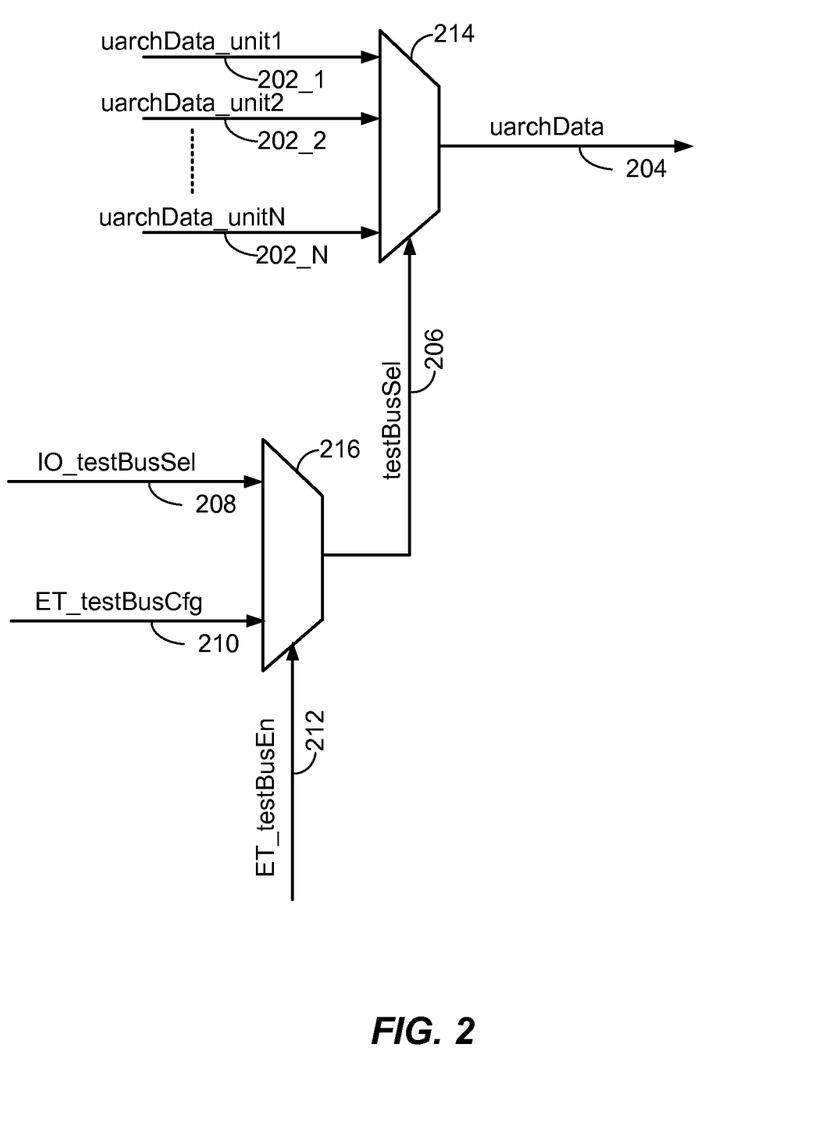
FIG. 2 illustrates an exemplary implementation for transmitting microprocessor states through chip input/output (IO) pins.

With reference now to FIG. 2, an exemplary implementation for transmitting microprocessor states through chip input/output (IO) pins is illustrated. Microarchitecture state information from N units: uarchData_unit1, uarchData_unit2 . . . uarchData_unitN may be transmitted to a multiplexor/selection unit 214 via buses 202_1, 202_2 . . . 202_N respectively. A control signal testBusSel 206 may be used to select microarchitecture state information from one of the N units, in order to generate uarchData to be sent to chip IO pins via bus 204. The generation of control signal testBusSel 206 may be as follows. In conventional implementations, control signal IO_testBusSel 208 may be used to select microarchitecture state information to be sent to chip IO pins. However, in exemplary embodiments, ET_testBusCfg 210 may be used to control microarchitecture state information such that microarchitecture state information may be correlated with architecture traces in ETM 100. ET_testBusCfg 210 may be generated by the user, for example, by configuring a register. Upon determining that microarchitecture state information is to be included in ETM 100 (for example, based on information derived from the signal, enable interleaved tracing 130 as described above with reference to FIG. 1), IO_testBusSel 208 may be overridden by ET_testBusCfg 210 in multiplexor/selection module 216 to generate the control signal testBusSel 206. The signal testBusSel 206 may then be used to select the microarchitecture state information from one of the N units, as described above.

Moreover, as previously described, ETM 100 may be configured to sample hardware state at operational speeds, correlate and interleave the same with program trace, packetize the interleaved program trace information and hardware state, and transmit the packets at a desired low speed. The packets may also be transmitted through a trace bus of ETM 100 (not shown), wherein the trace bus may be configured to flexibly accommodate 8, 16, or 32-bit bus widths.

Further, because hardware state is sampled in close relation to the instruction sequence, the timeline of the sampling may be controlled with a high degree of precision with respect to the architecture trace. Correspondingly, the sampling interval may also be precisely controlled, wherein start and end points of the sampling interval may be clearly defined. The start and end points may be controlled by the use of program counters and memory operation address/data triggering mechanisms which are usually included in ETM devices. Thus, exemplary embodiments may be configured at negligible additional cost. Moreover, precise sampling may also lead to improved data storage efficiency, and thus trace information pertaining to a large time interval can be efficiently transmitted through the trace bus to external devices.

In exemplary embodiments, the above described interleaved program tracing and hardware state functions may be dynamically enabled. For example, the interleaved tracing may be enabled by the use of an instruction, wherein the instruction may enable the interleaved tracing for a predetermined time period. The instruction may also include a predetermined sampling rate, such that interleaved program tracing and hardware state functions may be dynamically enabled at a predetermined sampling rate. The sampling rate may be derived from setting a configurable register in ETM 100. The sampling rate may be varied within a wide range. For example, the sampling rate may be as low as 1, i.e. microarchitecture trace information is sampled and a packet is generated every clock cycle. The sampling rate may also be as high as 64 Kbps or higher, based on particular implementations of embodiments. The sampling rate may be appropriately determined based on the operating speed of the microprocessor.

Figure 3:
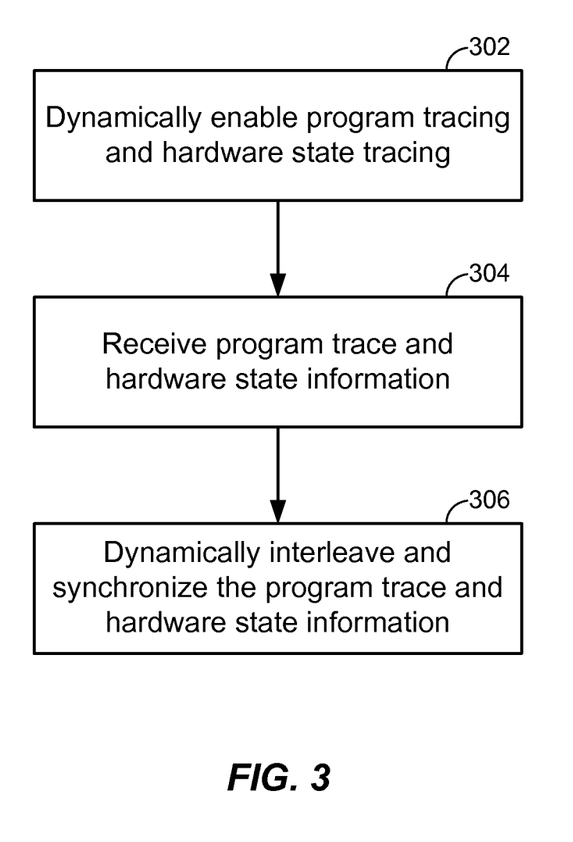
FIG. 3 is a flowchart illustrating a method for dynamically interleaving program tracing with hardware state information, according to exemplary embodiments.

It will be appreciated that embodiments include various methods for performing the processes, functions and/or algorithms disclosed herein. For example, as illustrated in FIG. 3, an embodiment can include a method for interleaved tracing of program state (e.g. program flow 120) and hardware state (e.g. hardware state 122) of a microprocessor in an embedded monitoring device (e.g. ETM 100) comprising: dynamically enabling program tracing and hardware state tracing, in Block 302 (e.g. via the signal, enable interleaved tracing 130); receiving program trace and hardware state information, in Block 304 (e.g. at core interface 104); and dynamically interleaving and synchronizing the program trace and hardware state information, in Block 306 (e.g. at packet generation and combining module 112).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for interleaved tracing of hardware state and program state of a microprocessor in an embedded monitoring device. Accordingly, the invention is not limited to illustrated examples and any means for performing the functionality described herein are included in embodiments of the invention.

Figure 4:
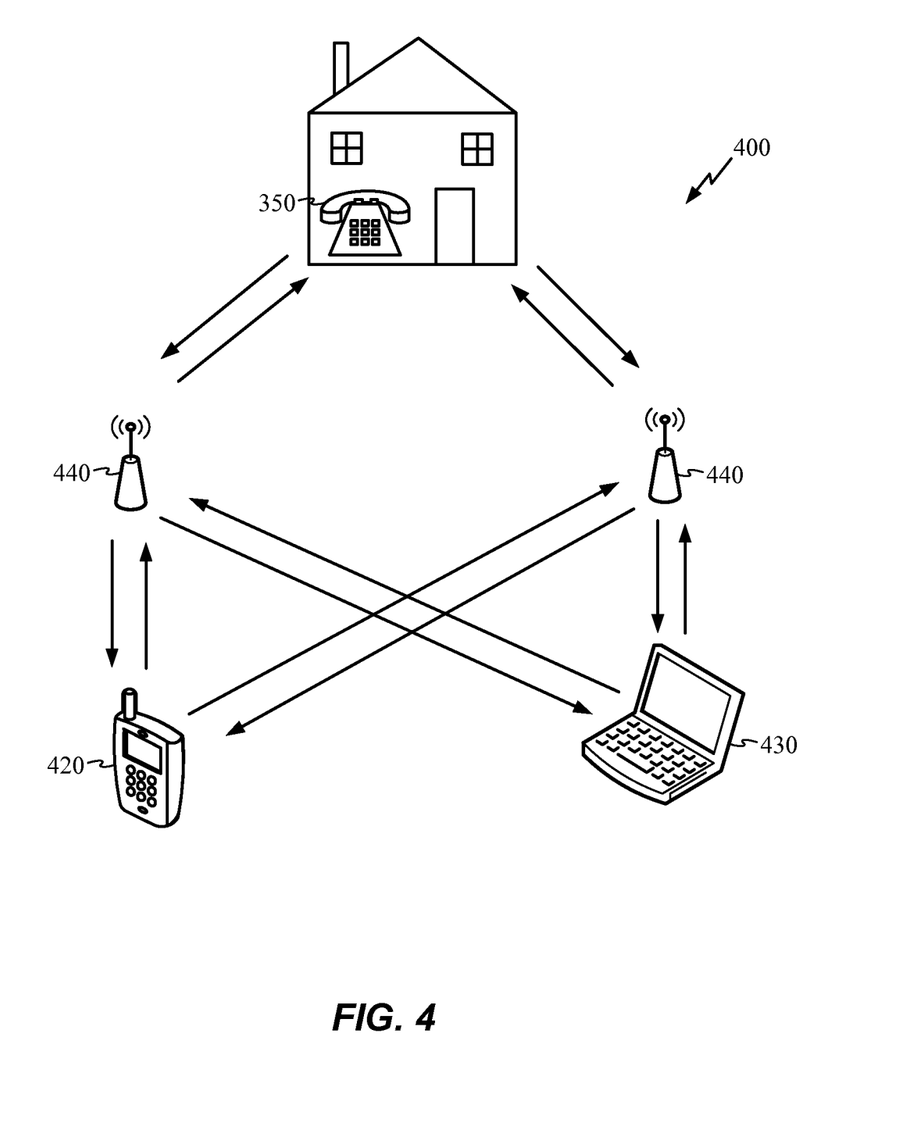
FIG. 4 illustrates an exemplary wireless communication system 400 in which an embodiment of the disclosure may be advantageously employed.

FIG. 4 illustrates an exemplary wireless communication system 400 in which an embodiment of the disclosure may be advantageously employed. For purposes of illustration, FIG. 4 shows three remote units 420, 430, and 450 and two base stations 440. In FIG. 4, remote unit 420 is shown as a mobile telephone, remote unit 430 is shown as a portable computer, and remote unit 450 is shown as a fixed location remote unit in a wireless local loop system. For example, the remote units may be mobile phones, hand-held personal communication systems (PCS) units, portable data units such as personal data assistants, GPS enabled devices, navigation devices, settop boxes, music players, video players, entertainment units, fixed location data units such as meter reading equipment, or any other device that stores or retrieves data or computer instructions, or any combination thereof. Although FIG. 4 illustrates remote units according to the teachings of the disclosure, the disclosure is not limited to these exemplary illustrated units. Embodiments of the disclosure may be suitably employed in any device which includes active integrated circuitry including memory and on-chip circuitry for test and characterization.

The foregoing disclosed devices and methods may be designed and configured into GDSII or GERBER computer files, stored on a computer readable media. These files are in turn provided to fabrication handlers who fabricate devices based on these files. The resulting products are semiconductor wafers that are then cut into semiconductor die and packaged into a semiconductor chip. The chips are then employed in devices described above.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. An Embedded Trace Macrocell (ETM) device comprising:
   logic to dynamically enable interleaved program trace and hardware state sampling;
   a core interface configured to receive program trace and hardware state information of a microprocessor; and
   a packet generation and combining module configured to form the program trace and hardware state information into packets, and interleave and combine the packets of the program trace and hardware state information.

2. The ETM device of claim 1, wherein a header field for a packet of the program trace information is different from a header field for a packet of the hardware state information.

3. The ETM device of claim 1, wherein the hardware state is sampled at the operational speed of the microprocessor.

4. The ETM device of claim 1, wherein the programming interface is a JTAG interface.

5. The ETM device of claim 4, wherein the JTAG interface is configured to program the sampling rate of the hardware tracing.

6. The ETM device of claim 4, wherein the JTAG interface is configured to determine one of a plurality of hardware buses to monitor.

7. The ETM device of claim 1, integrated in at least one semiconductor die.

8. The ETM device of claim 1, integrated into a device, selected from the group consisting of a set top box, music player, video player, entertainment unit, navigation device, communications device, personal digital assistant (PDA), fixed location data unit, and a computer.

9. A method for interleaved tracing of hardware states of a microprocessor with program tracing in an embedded monitoring device comprising:
   dynamically enabling hardware state tracing and program tracing;
   receiving program trace and hardware state information;
   generating packets of the program trace and hardware state information; and
   dynamically interleaving and combining the packets of the program trace and hardware state information.

10. The method of claim 9, further comprising: delaying the generating packets of the hardware state information based on a packet generation bandwidth occupied by the program trace information.

11. The method of claim 9, further comprising:
   buffering the interleaved and combined packets of the program trace and hardware state information at a first rate; and
   transmitting the interleaved and combined packets of the program trace and hardware state information at a second rate.

12. The method of claim 11, wherein the first rate is the operational speed of the microprocessor.

13. The method of claim 9, wherein the dynamically enabling hardware state tracing and program tracing is based on an instruction.

14. The method of claim 13, wherein the instruction further specifies a duration for hardware state and program tracing, wherein the duration is one of: a predetermined duration, or a dynamic duration.

15. The method of claim 14, wherein the dynamic duration is based on a program executed by the microprocessor.

16. The method of claim 14, wherein the dynamic duration is based on dynamic events related to the microprocessor.

17. The method of claim 13, wherein the instruction further specifies a predetermined sampling rate.

18. The method of claim 9, wherein the dynamically enabling hardware state tracing is based on a predetermined architecture state of the microprocessor.

19. A system comprising:
   means for dynamically enabling program tracing and hardware state tracing in an embedded monitoring device;
   means for receiving program trace and hardware state information;
   means for generating packets of the program trace and hardware state information; and
   means for dynamically interleaving and combining packets of the program trace and hardware state information.

20. The system of claim 19, further comprising: means for delaying the generating packets of the hardware state information based on a packet generation bandwidth occupied by the program trace information.

21. The system of claim 19, further comprising:
   means for buffering the interleaved and combined packets of the program trace and hardware state information at a first rate; and
   means for transmitting the interleaved and combined packets of the program trace and hardware state information at a second rate.

22. A non-transitory computer-readable storage medium comprising code, which, when executed by a processor, causes the processor to perform operations for interleaved tracing of hardware states of a microprocessor with program tracing in an embedded monitoring device, the non-transitory computer-readable storage medium comprising:
   code for dynamically enabling hardware state tracing and program tracing;
   code for receiving program trace and hardware state information;
   code for generating packets of the program trace and hardware state information; and
   code for dynamically interleaving and combining packets of the program trace and hardware state information.

23. The non-transitory computer-readable storage medium of claim 22, further comprising: code for delaying the generating packets of the hardware state information if a packet generation bandwidth is occupied by the program trace information.

24. The non-transitory computer-readable storage medium of claim 22, further comprising:
   code for buffering the interleaved and combined packets of the program trace and hardware state information at a first rate; and
   code for transmitting the interleaved and combined packets of the program trace and hardware state information packets at a second rate.

* * * * *